United States Patent [19]

Short

[11] 4,199,489

[45] Apr. 22, 1980

[54] MOISTURE CURING POLYURETHANE TOPCOAT PAINT DISPLAYING GEOMETRIC METAMERISM

[75] Inventor: William T. Short, Southfield, Mich.

[73] Assignee: General Motors Corporation, Detroit, Mich.

[21] Appl. No.: 920,136

[22] Filed: Jun. 28, 1978

Related U.S. Application Data

[63] Continuation-in-part of Ser. No. 795,798, May 11, 1977.

[51] Int. Cl.$^2$ .............................................. C08K 3/08
[52] U.S. Cl. ............................... 260/37 M; 260/37 N
[58] Field of Search ............. 260/37 N, 37 M; 528/60

[56] References Cited

U.S. PATENT DOCUMENTS

| | | | |
|---|---|---|---|
| 3,234,038 | 2/1966 | Stephens et al. ........................ | 117/71 |
| 3,436,361 | 4/1969 | Wooster ................................. | 260/18 |
| 3,499,783 | 3/1970 | Nelson et al. ........................... | 117/72 |
| 3,625,921 | 12/1971 | Wooster et al. ............. | 260/77.5 AT |
| 3,639,355 | 2/1972 | Wooster et al. ............. | 260/77.5 AP |
| 3,764,067 | 10/1973 | Coffey et al. ................. | 260/37 M X |
| 3,919,173 | 11/1975 | Coyner et al. ................. | 260/37 N X |

OTHER PUBLICATIONS

Curtis, "Higher Solids Coatings", 4th Water Borne and Higher Solids Coatings Symp., 2/14/77, (vol. 2, pp. 98–109).

*Primary Examiner*—Sandra M. Person
*Attorney, Agent, or Firm*—George A. Grove

[57] ABSTRACT

In a preferred embodiment, an improved high solids polyurethane paint composition contains metallic flake pigment and a binder comprising a particular isocyanate-terminated polyether-urethane resin. The resin is formed by reacting an excess of a suitable aliphatic diisocyanate with a suitable mixture of polyoxypropylene diols and triols and a hindered piperidine type UV stabilizer in the presence of an organotin catalyst. The product urethane resin having the stabilizer reacted into its molecular structure is formulated with color producing pigments, metallic flakes and a suitable solvent to produce a composition having a nonvolatiles content of 60 to 70 weight percent. The composition is spray applied to a substrate and moisture cured to provide a decorative topcoat wherein the flakes lie at varying depths and are oriented substantially parallel to the topcoat surface. The topcoat with the desired flake orientation displays a high degree of geometric metamerism comparable to metallic acrylic lacquer topcoats applied at a substantially lower solids content.

6 Claims, No Drawings

MOISTURE CURING POLYURETHANE TOPCOAT PAINT DISPLAYING GEOMETRIC METAMERISM

This application is a Continuation-In-Part of my copending application, Ser. No. 795,798, filed May 11, 1977.

BACKGROUND OF THE INVENTION

This invention relates to a metallic urethane paint film having a high degree of geometric metamerism. More particularly, this invention relates to a high-solids paint composition containing isocyanate-terminated urethane resins and metal flake pigment, which resins are moisture curable to produce a decorative topcoat wherein the flakes are substantially uniformly oriented parallel to the topcoat surface to provide an aesthetically pleasing finish having a high degree of geometric metamerism.

Geometric metamerism is the ability of a paint film to exhibit subtle variations in color and appearance depending upon the directions from which it is illuminated and viewed. This effect is produced by metal flakes incorporated into the film at varying depths and lying substantially parallel to the film surface. Light rays traveling through the film are reflected by the flakes to the viewer. For a paint film also containing a color-producing pigment, the degree of interaction between that agent and a light ray—that is, the degree of color or hue—depends upon the distance traveled by the light ray through the film. Light rays reflected from flakes at varying film depths travel different distances through the film. Thus, the viewer perceives a combination of light rays having different degrees of color. More importantly, the distance traveled by light rays reflected off the flakes depends upon the angle of incidence and the angle of reflection. Light rays traveling normal to the flake surface travel a shorter distance than light rays traveling at acute angles. Thus, the "average" color is directly related to the illumination and viewing angles. The combination of these phenomena makes a film having geometric metamerism appear to be brighter and have a lighter hue when viewed normal to its surface than when viewed at an acute angle. That is, a viewer looking directly down upon the film surface observes a light, bright color. Flakes near the film surface reflect light that only slightly interacts with the color-producing pigment and so appear to sparkle. When the viewer shifts to look at the film at an acute angle to its surface, a darker, more intense color is perceived. Because of the greater degree of interaction, less sparkling is observed and the film appears generally deeper or thicker. At very shallow angles approaching the plane of the film surface, multiple reflections between metal flakes dramatically increase the light-pigment interaction and thereby makes the film appear extremely dark and deep.

Geometric metamerism, also referred to as goiniochromatism or simply "flop," makes an overall aesthetically pleasing impression upon the viewer. For this reason, it is highly preferred in decorative finishes and particularly in automotive topcoats. The subtle color variations helps to hide surface irregularities and highlight styling lines and contours. It is known that the degree of geometric metamerism is greatest when the metal flakes are oriented uniformly and substantially parallel to the film surface. More random metal flake orientation decreases the degree of geometric metamerism.

A typical prior art topcoat exhibiting a high degree of geometric metamerism is formed by the spray application of an aluminum flake-containing acrylic lacquer having a nonvolatiles content of between 15 and 35 weight percent. The viscosity of the low-solids lacquer is sufficiently low to permit the flakes to move and become approximately oriented as desired during film leveling immediately after application. The massive solvent evaporation during curing creates turbulence within the film and causes the film to shrink toward the substrate surface, thereby providing additional aligning forces to orient the flakes as desired. The result is a coating wherein the metal flakes are oriented substantially parallel to the film surface and thereby provide a high degree of geometric metamerism. Heretofore, the geometric metamerism obtained with low-solids lacquers has not been reproduced with paints having higher solids concentrations, such as 60 to 70%, because the higher viscosity and the lower solvent evaporation of such paints do not produuce the same uniformity of flake orientation.

It is also known that suitably formulated polyurethane resins provide a tough, yet flexible finish that has improved chip and impact resistance. Polyurethane paint compositions formulated with a high solids concentration are known to reduce solvent emissions during curing. While such properties recommend polyurethane paint binder resin for applications such as automotive topcoats, the use of such resins has heretofore been deterred because they did not display adequate resistance to degradation and fading when exposed to outdoor conditions and because they did not provide the good geometric metamerism obtained using low-solids lacquers. In my copending application, a polyurethane resin is disclosed that has an improved resistance to degradation and fading when exposed to moisture and sunlight.

Accordingly, it is an object of my invention to provide an improved polyurethane paint film that exhibits the high degree of geometric metamerism typically associated with metal flake-containing, acrylic lacquer finishes.

It is a further object of my invention to provide an improved paint composition containing an isocyanate-terminated, polyurethane prepolymer resin and aluminum flakes and having a high nonvolatiles concentration, said resin being moisture curable to produce a decorative coating wherein the metal flakes lie at varying depths and are oriented substantially parallel to the film surface to provide a high degree of geometric metamerism. The uniformity of flake orientation in the subject coating and, therefore, the degree of geometric metamerism are comparable to acrylic lacquer topcoats applied with significantly higher solvent concentrations.

It is a still further object of one aspect of my invention to provide a high-solids urethane paint composition that is moisture curable to produce a decorative topcoat having improved resistance to degradation and fading when exposed to outdoor conditions and also having a high degree of geometric metamerism. A urethane paint having these properties is particularly useful as an automotive topcoat.

SUMMARY OF THE INVENTION

In accordance with a preferred embodiment of my invention, these and other objects are accomplished by a paint composition having a nonvolatiles concentration of 60–70 weight percent or higher and containing aluminum flake pigment and a binder comprising a particular isocyanate-terminated polyether urethane resin. The particular urethane formulation produces a composition having a surprisingly low viscosity in consideration of its high-solids content. The paint composition is spray applied to a substrate and moisture cured to produce a tough, impact-resistant finish. The particular resin structures and the low viscosity of the composition cause the aluminum flakes to orient substantially parallel to the paint surface and to be distributed generally uniformly across the thickness of the film. The aluminum flake orientation is substantially similar to previous metal flake orientation obtained in acrylic lacquer films applied at significantly lower solvent concentrations. Thus, the urethane paint composition of my invention produces a film having a high degree of geometric metamerism.

The urethane resin in my paint composition is formed by mixing and coreacting an appropriate amount of an aliphatic diisocyanate, preferably methylene bis (4-cyclohexyl isocyanate), with a polyoxypropylene diol and a higher-functional polyoxypropylene polyol in the presence of a suitable organotin catalyst to form a prepolymer having urethane linkages. The ratio of isocyanate groups to total hydroxyl groups is initially at least 1.5 to 1 and preferably greater than 2 to 1 to produce a relatively low molecular weight, isocyanate-terminated resin. The molecular weights and proportions of the diols and higher-functional polyols are balanced to provide proper viscosity in the uncured resins and suitable chemical and physical properties in the cured paint. After application, the paint film is cured by exposing it to water vapor at slightly elevated temperatures. In the presence of water, the terminal isocyanate groups react to form primarily urea linkages and thereby polymerize the film. In one embodiment, an ultraviolet light stabilizer capable of reacting with isocyanate or hydroxyl groups is advantageously added to the diisocyanate-diol-polyol mixture and coreacted into the prepolymer molecule, thereby ultimately producing a coating having resistance to degradation and fading when exposed to outdoor conditions.

To the resin is added aluminum flake, other pigments and solvents. The pigments preferably include a color-producing agent. The total amount of solvent added does not exceed 30 to 40% by weight of the total paint composition as needed for spray application. A blend of organic solvents is preferred. A suitable low boiling solvent is typically added to lower the compositional viscosity to permit spraying, yet evaporate sufficiently fast to prevent sagging of the uncured film on the substrate. A high boiling solvent component permits the composition to flow out and level on the substrate and also controls the curing rate. The particular choice of solvents is governed by conditions under which the composition is applied to the substrate, such as the distance from the spray nozzle to the substrate and the ambient temperature. It is an important feature of this invention that the particular urethane resin structures are such that a small amount of solvent is effective to lower the viscosity to permit spray application, good film formation, and preferred orientation of the metal flakes.

DETAILED DESCRIPTION OF THE INVENTION

An isocyanate-terminated urethane resin mixture was prepared as follows:

Methylene bis (4-cyclohexyl isocyanate) obtained from E. I. DuPont de Nemours & Company was employed. This diisocyanate is a liquid stereoisomeric mixture sold under the trade name of "Hylene W." The material is sometimes generically referred to as $H_{12}MDI$. Analysis showed it to be of greater than 99.2% purity. A polyoxypropylene diol having a number average molecular weight of approximately 1000 was employed. It was obtained from BASF Wyandotte Corporation under the trade designation "P1010" and had a hydroxyl number of 106. A combination of two polyoxypropylene triols was also used. The triols were based on trimethylol propane and obtained from BASF Wyandotte Corporation under the trade designation "TP440" and "TP1540." They had hydroxyl numbers of 395 and 107, respectively, and number average molecular weights of about 425 and 1500, respectively. Also, included in the reactive mixture was bis (2,2,6,6 tetramethyl piperidinyl-4) sebacate. This compound is an ultraviolet light stabilizer that improves the resistance of the paint film to degradation and fading when exposed to outdoor conditions. It is manufactured by Ciba-Geigy under the trade designation "Tinuvin 770 ®." Dibutyltin dilaurate was used as the catalyst.

The following proportions of each of the above ingredients was employed in the preparation of the urethane resin prepolymer:

| Constituent | Parts By Weight | Milliequivalents |
| --- | --- | --- |
| Diisocyanate-Hylene W | 58.8 | 449 |
| Diol - P1010 | 17.3 | 33 |
| Triol - TP440 | 14.2 | 100 |
| Triol - TP1540 | 8.7 | 17 |
| Catalyst - Dibutyltin Dilaurate | 0.02 | — |
| Bis 2,2,6,6 Tetramethyl Piperidinyl-4) Sebacate-Tinuvin 770 ® | 1.0 | 4 |

The ratio of isocyanate groups to hydroxyl groups is 3.0 to 1. The ratio of triols to total polyols in terms of chemical equivalents was about 0.78. The above constituents were mixed with approximately 10 parts by weight of dry n-butyl acetate. The mixture was reacted for twenty-four hours at room temperature. During the reaction, the hydroxyl groups react with the isocyanate to form a polymer having urethane linkages. The excess of isocyanate groups to hydroxyl groups produces a reaction product containing a plurality of isocyanate-terminated molecules of relatively low molecular weight. It is an important feature of this embodiment of my invention that the isocyanate groups also react with the reactive amine groups of the stabilizer. Thus, the stabilizer is chemically reacted into the prepolymer resin, while maintaining its stabilizing properties, so that it can neither diffuse out of the final topcoat film nor undergo phase separation or aggregation. Because the number of reactive sebacate amine groups was small in comparison to the total hydroxyl groups present, the sebacate had a negligible effect upon the overall resin molecular structure and the prepolymer properties necessary to produce the desired geometric metamerism. Thus, in this example, the prepolymer resin formulation was accurately defined by reference to the diisocyanate, diol and triols present and their ratios, without including the sebacate.

The previously prepared prepolymer binder was then mixed with phthaloblue pigment (obtained from E. I. DuPont de Nemours & Company) and with solvents. To aid in dispersing the color producing pigment in the paint composition, a small quantity of the binder was first milled with the pigment and a small amount of solvent in the following proportions:

| Constituent | Parts By Weight |
|---|---|
| Binder | 77 |
| Phthaloblue | 75 |
| n-Butyl Acetate | 3.5 |
| Cellosolve Acetate | 3.5 |

The mixture was milled until a pigment particle size under 20 microns was obtained. This mill paste was then mixed with additional urethane prepolymer binder resin and solvent to obtain the following formulation:

| Constituent | Parts By Weight |
|---|---|
| Binder | 100 |
| Phthaloblue | .5 |
| Cellosolve Acetate | 8.5 |
| n-Butyl Acetate | 8.5 |
| Methyl Ethyl Ketone | 17.1 |

The aluminum flake pigment was then added to complete forming the desired paint composition. A non-leafing aluminum pigment of typical automotive grade was employed. It was obtained from Silberline Manufacturing Co. under the trade designation "Coarse Aluminum Paste No. 3141 AR." The paste contains about 50% by weight of aluminum flake and the balance essentially mineral oil and acetone. To assist in dispersing the flake in the previously prepared blue resin formulation, the desired amount of aluminum paste was initially mixed with approximately equal amounts of resin and solvent, thereby lowering the paste viscosity and initially wetting the flakes. The mixture containing coarse aluminum flake was added to the above blue pigmented formulation along with additional solvent and catalyst to obtain a blue metallic moisture-curing urethane paint of the following composition, wherein the amount of aluminum flake is reported as a dry flake weight and the amounts of other material present in the commercial aluminum paste are ignored:

| Constituent | Parts By Weight |
|---|---|
| Binder | 100 |
| Phtaloblue | 0.5 |
| Aluminum Flake | 1.6 |
| Methyl Ethyl Ketone | 34 |
| n-Butyl Acetate | 17 |
| Cellosolve Acetate | 17 |
| Dibutyltin Dilaurate | 0.06 |

The urethane paint composition had a nonvolatiles concentration of 60% by weight. The pigment (including flake) to binder ratio was 2.1:100. The viscosity of the above paint formulation was 0.5 poise (Zahn 2 Cup viscosity of 27.6 sec.), suitably low for spray application.

The above paint composition was spray applied over Bonderite 40 phosphated steel substrates which had been primed using a commercially available primer obtained from the PPG Industries, Inc., under the trade designation 80.593. The topcoats were applied using standard siphon fed spray guns and cured for 30 minutes at 88° C. and 45% relative humidity in a Tenney-Mite 5 temperature/humidity chamber.

The cured topcoats were decorative and glossy and found to have excellent mechanical properties. They were tough, flexible and resistant to chipping and other mechanical failure. In accordance with the tests reported in my copending application, the coatings exhibited excellent stability when exposed to ultraviolet radiation. Visual examination of the coatings demonstrated that they displayed a high degree of geometric metamerism that was qualitiatively comparable to conventional metallic acrylic lacquer topcoats.

An effort was made to quantitatively compare the aluminum flake orientation obtained with the above-mentioned urethane paint composition and that obtained with a conventional acrylic lacquer. The flake orientation was determined by removing a portion of the urethane topcoat along with about one mil of primer from the steel substrate. The coating was then sectioned on a microtome. The sections were then photographed end on using Leitz optical microscope in the reflectance mode. From the photomicrographs, the orientation of all aluminum flake in the coating section were determined relative to the coating surface. The results of this analysis for the blue metallic coating of this embodiment are presented in Table 1.

TABLE 1

Distribution of Flake Orientations

| Angle of Flake Relative to Film Surface (Degrees) | Blue Metallic Urethane Topcoat | | Conventional Acrylic Lacquer |
|---|---|---|---|
| | Number of Flakes in Interval | Percent of Flakes in Interval | Percent of Flakes in Interval |
| 0–4.5 | 79 | 42.2 | 42.7 |
| 5–9.5 | 40 | 21.4 | 23.8 |
| 10–14.5 | 24 | 12.8 | 14.7 |
| 15–19.5 | 18 | 9.6 | 7.9 |
| 20–24.5 | 6 | 3.2 | 1.2 |
| 25–29.5 | 5 | 2.7 | 1.8 |
| 30–34.5 | 4 | 2.1 | 2.5 |
| 35–39.5 | 4 | 2.1 | |
| 40–44.5 | 1 | 0.6 | 1.2 |
| 45–49.5 | 1 | 0.6 | |
| 50–54.5 | 2 | 1.2 | 1.2 |
| 55–59.5 | 1 | 0.6 | |
| 60–64.5 | 0 | 0 | 1.2 |
| 65–69.5 | 0 | 0 | |
| 70–74.5 | 1 | 0.6 | 1.2 |
| 75–79.5 | 1 | 0.6 | |
| 80–84.5 | 0 | 0 | 1.2 |
| 85–90 | 0 | 0 | |
| Total | 187 | | |

For purposes of illustration, the total number of flakes having orientation angles falling with 5° intervals is presented. It is seen that over 40% of the flakes are oriented within 5° of the surface and over 70% of the flakes are within 10°. The data was also used to calculate an average orientation angle for the aluminum flakes by multiplying each orientation angle by the number of flakes having that angle, summing this value over all angles and dividing by the total number of flakes. The average orientation angle for the above-described blue metallic urethane coating was 10.5°.

Table 1 also presents the results of a similar analysis conducted on a conventional acrylic lacquer film having a high degree of geometric metamerism. The acrylic lacquer was a commercial automotive topcoat obtained from the E. I. DuPont de Nemours and Company under the trade designation 927-AF156. The lacquer was applied at a nonvolatile concentration of 19% by weight. Comparison of the values presented in Table 1 shows that the subject urethane paint composition produces a distribution of flake orientation substantially similar to that obtained using conventional acrylic lacquers. The average flake orientation for the acrylic lacquer in this test was 10.9° and compared favorably with the subject urethane paint. Similar tests preformed on several conventional lacquers indicate that suitable films generally have average orientation angles of between about 6.9° and 12.7°.

It is apparent to one skilled in the art that other color producing agents can be substituted for the phthaloblue pigment in the above embodiment without substantially affecting the aluminum flake orientation. A green metallic coating was produced using a paint composition containing a phthalogreen pigment and the resin binder described above. The green paint composition was prepared similar to the blue composition, but had a nonvolatiles content of 70% by weight. The compositional viscosity was 1.0 poise (43.4 seconds for a Zahn 2 Cup) and the phthalogreen pigment to binder weight ratio was 2.5:100. The paint composition contained 0.5 gram (dry) of aluminum flake for each 100 grams of isocyanate-terminated resin. The composition was applied to primed substrates and cured. The coating had a generally dark green color and displayed a high degree of geometric metamerism. Analysis of the coating indicated that it had an average orientation angle of 7.3° and that over 70% of the flakes were oriented within 10° of the surface, surprising in view of its high solids content.

A second green coating was produced using the same isocyanate-terminated resin. It had a nonvolatile concentration of 68% by weight, a viscosity of 1.2 poise (46.0 seconds for a Zahn 2 Cup), and a phthalogreen pigment to binder weight ratio of 2.9:100. The dry concentration of the aluminum flake was 1.0 grams for every 100 grams of resin binder. Thus, this second green coating differed primarily from the previously described green coating in the proportion of aluminum flake. This resulted in a coating having an overall lighter green hue, in spite of the slightly larger phthalogreen concentration. This light green coating also displayed a high degree of geometric metamerism. Analysis of the aluminum flake in the finished coating indicated that the average orientation angle was 12.0° and that over 60% of the flakes had an orientation of less than 10° relative to the finished surface.

In the above examples, the high solids content, moisture curable urethane paint compositions of my invention produced decorative metallized topcoats in which a large number of aluminum flakes were distributed generally uniformly across the thickness of the film. However, the flakes were also arranged in a preferred orientation in which a major portion of their number were substantially parallel to the film surface. This orientation was surprisingly obtained despite the high solids content of the paint formulation. The result is that my paints provide attractive and durable topcoat surfaces with less solvent disposal effort.

To a great extent the degree of geometric metamerism is related to the orientation of the aluminum flakes with respect to the film surface. A high degree of geometric metamerism is generally obtained where the average aluminum flake orientation is 15° or less, and preferably 12° or less. Typically, the coatings of my invention have an average flake orientation angle of between 5° and 12°. Besides the average orientation angle, it is also important in obtaining a high degree of geometric metamerism that the majority of flakes are oriented at a low angle relative to the surface. In the above coatings, the great preponderance of the flakes —60 to 70%—lie within 10° of being parallel to the surface. While flake orientation is important, other factors also contribute to the overall effect of geometric metamerism, particularly the refractive index of the film, and thereby prevent a more direct comparison of the color variations.

In the above examples, the diisocyanate employed in the preparation of the prepolymer resin was methylene bis (4-cyclohexyl isocyanate). Other aliphatic diisocyanates could be suitably employed to prepare urethane prepolymer resins useful for forming the high-solids, low-viscosity paint compositions of my invention. Suitable isocyanates include isophorone diisocyanate, lysine diisocyanate, and the biuret of hexamethylene diisocyanate.

In the preparation of the prepolymer resin, it is preferred that a mixture of polyoxpropylene diols and higher functional polyols be used. Polyoxypropylene diols having molecular weights in the range of about 200 to 4,000 may be used. Polyoxypropylene triols or higher functional polyols with molecular weights in the range of about 400 to 4,000 are suitable. The presence of higher functional polyols provides chain branching and ultimately cross-linking so that a suitable tough, flexible, chip resistant paint is obtained. Good coating properties are obtained where the ratio of equivalents of triol or higher functional polyols to total polyol is in the range of 0.1 to 0.9.

Of importance in obtaining a resin binder capable of forming a low viscosity, high-solids paint composition is the ratio of isocyanate groups to the total of hydroxyl groups. In general, ratios of 1.5:1 or greater are suitable and ratios in the range of 2:1 to 3:1 are preferred. Where the reactants are mixed at the desired ratio, the reaction between an aliphatic isocyanate with body polyoxypropylene diol and higher functional polyol forms a urethane prepolymer resin having low molecular weight and capable of forming paint compositions that are moisture curable to produce topcoats displaying geometric metamerism.

In the preferred embodiment, a small amount of bis (2,2,6,6 tetramethyl piperidinyl-4) sebacate was co-reacted with the diisocyanate and the polyols during the preparation of the moisture curable, isocyanate-terminated urethane prepolymer resin. The hindered bis-piperidinyl material is a known ultraviolet light stabilizer. I have found that it is particularly advantageous to react this type of stabilizer with my isocyanate so as to incorporate this stabilizer directly into the prepolymer resin molecular structure. Incorporation of the stabilizer in this manner produces a coating having improved resistance to degradation and fading when exposed to outdoor conditions. While the aforementioned hindered piperidinyl sebacate is preferred, other bispiperidinyls of aliphatic dicarboxylic acids are known light stabilizers and may be similarly employed. Other types of stabilizers capable of reacting with isocyanate or hydroxyl groups may also be advantageous co-reacted into the prepolymer molecule in accordance with the practice of my invention.

I have found that the amount of the preferred hindered sebacate effective to produce the desired film stability is normally from 0.1% to about 2% by weight of the resin. The incorporation of a small amount of the stabilizer in the aforementioned manner has no noticeable effect upon the orientation of the aluminum flakes. Coatings displaying a high degree of geometric metamerism have been produced with similar isocyanate-terminated, polyether-urethane prepolymer resins that do not contain a stabilizer. When the amount of stabilizer is small, its effect upon the overall prepolymer resin molecular structure and the properties necessary to produce the desired aluminum flake orientation is small. Thus, the prepolymer resin formulation is essentially defined by the amounts and ratios of the diisocyanate, diol and higher-functional polyols initially present and it is unnecessary to consider the stabilizer. When larger proportions of stabilizer are incorporated into the prepolymer resin structure, the resin binder is more accurately described by including the stabilizer. That is, for a stabilizer concentration of about 2% or greater, a suitable prepolymer resin is obtained where the ratio of the diisocyanate to the total of the hydroxyl groups and the reactive groups of the stabilizer is 1.5:1 or greater and preferably between 2:1 and 3:1.

It is apparent that other color-producing pigments may be substituted for the phthaloblue and phthalogreen pigments employed in the examples set forth herein. Thus, urethane topcoats having a wide range of colors and displaying geometric metamerism may be produced. It is also apparent that small amounts of other pigments could be added without substantially detering the desired aluminum flake orientation. For example, an ultraviolet light stabilizer might be added in the conventional fashion as a pigment, rather than reacted into the urethane resin structure. It is also within the skill of the art to vary the catalyst and its concentration to obtain a satisfactorily cured coating. In comparison with the resin structure, the use of other pigments or catalysts has a negligible effect on the degree of geometric metamerism.

Subsequent experiments wherein the urethane paint composition was analysized immediately after application to a metal substrate indicated that the solids content of the freshly applied film was typically about 85% by weight. The change in solvent concentration is attributed to evaporation occurring after the spray leaves the gun. Solvent continues to evaporate after the film is applied. However, from these experiments, it is believed that the on-panel film viscosity necessary to obtain good flake orientation needs to be less than 10 poise at a shear rate of 15.7 sec$^{-1}$ and preferably between 1 and 5 poise. Obviously, the viscosity should not be so low as to permit the paint to run or sag before it is cured. Solvent systems of varying concentration or containing compounds other than methyl ethyl ketone, n-butyl acetate or cellosolve acetate may be formulated to provide the desired flake orientation without causing sagging.

The maximum advantages of my invention are obtained where the total solvent concentration is no greater than 40 weight percent. The use of a low solvent spray composition minimizes the quantity of solvents that must be evaporated during paint drying and permits lower drying temperatures in the paint curing oven. It is an important feature of my invention that the particular resin structures may be applied using a minimal solvent concentration.

While my invention has been described in terms of certain specific embodiments thereof, it will be appreciated that other forms could readily be adapted by those skilled in the art and, accordingly, the scope of my invention is to be considered limited only by the following claims.

The embodiments of the invention in which an exclusive property or privilege is claimed are defined as follows:

1. A high-solids, moisture curable topcoat paint composition containing a metal flake pigment and formulated to be sprayed onto a substrate and to flow and cure thereon into a polyurethane film in which the metal flakes are oriented so as to interact with incident light to produce geometric metamerism, said composition comprising as the binder resin forming component an isocyanate-terminated, moisture curable prepolymer which is the reaction product of an aliphatic diisocyanate and an isocyanate group-reactive mixture comprising a polyoxypropylene diol and a polyoxypropylene polyol having a hydroxyl functionality of at least three, the ratio of isocyanate groups to total hydroxyl groups initially being at least 1.5 to 1, metal flakes, a catalyst to enhance the moisture curing of said paint composition, and a solvent in an amount to reduce the viscosity of the composition for spray application, the nonvolatile content of the composition making up at least 60% of the total, the combination of said constituents in a curing film produced from said composition cooperating to permit the metal flakes to orient substantially parallel to the surface of the cured film.

2. A high-solids, moisture curable topcoat paint composition containing a metal flake pigment and formulated to be applied by spray onto a substrate and to flow and cure thereon into a polyurethane film in which the metal flakes lie at varying depths and are oriented substantially parallel to the film surface, whereby said film displays a high degree of geometric metamerism, said composition comprising as the binder resin forming component an isocyanate-terminated, moisture curable prepolymer which is the catalyzed reaction product of a mixture comprising an aliphatic diisocyanate, a polyoxypropylene diol and a polyoxypropylene polyol having a hydroxyl functionality of at least three, the ratio of isocyanate groups to total hydroxyl groups initially being at least 2 to 1, a color producing pigment, metal flakes, a catalyst to enhance the moisture curing of said paint composition, and a solvent formulated to produce the viscosity in the freshly applied film of 10 or less poises measured at a shear rate of 15.7 sec$^{-1}$, the combination of said constituents in a curing film produced from said composition cooperating to orient the metal flakes as desired.

3. A high-solids, moisture curable topcoat paint composition containing a metal flake pigment and formulated to be applied by spray onto a substrate and to flow and cure thereon into a polyurethane film in which the metal flakes lie at varying depths and are oriented substantially parallel to the film surface, whereby said film displays a high degree of geometric metamerism, said composition comprising
- as the binder resin forming component an isocyanate-terminated, moisture curable prepolymer which is the catalyzed reaction product of a mixture comprising an aliphatic diisocyanate, a polyoxypropylene diol and a polyoxypropylene polyol having a hydroxyl functionality of at least three, the ratio of isocyanate groups to total hydroxyl groups initially being at least 2 to 1,
- a color producing pigment,
- metal flakes,
- a catalyst to enhance the moisture curing of said paint composition, and
- a solvent formulated to produce the viscosity in the freshly applied film of between 1 and 5 poises measured at a shear rate of 15.7 sec$^{-1}$,
- the combination of said constituents in a curing film produced from said composition cooperating to orient the metal flakes as desired.

4. A high-solids, moisture curable topcoat paint composition containing a metal flake pigment and formulated to be sprayed onto a substrate and to flow and cure thereon in a polyurethane film in which the metal flakes are oriented so as to interact with incident light to produce geometric metamerism, said composition comprising
- as the binder resin forming component an isocyanate-terminated, moisture curable prepolymer which is the reaction product of methylene bis (4-cyclohexyl isocyanate) and an isocyanate group-reactive mixture comprising a polyoxypropylene diol and a polyoxypropylene polyol having a hydroxyl functionality of at least three, the ratio of isocyanate groups to total hydroxyl groups initially being at least 2 to 1,
- a color producing pigment,
- metal flakes,
- a catalyst to enhance the moisture curing of said paint composition, and
- a solvent, if required, in an amount to reduce the viscosity of the composition for spray application, the nonvolatile content of the composition making up at least 60% of the total,
- the combination of said constituents in a curing film produced from said composition cooperating to permit the metal flakes to orient substantially parallel to the surface of the cured film.

5. A high-solids, moisture curable topcoat paint composition containing an aluminum flake pigment and formulated to be sprayed onto a substrate and to flow and cure thereon into a polyurethane film in which the metal flakes are oriented so as to interact with incident light to produce geometric metamerism, said composition comprising
- as the binder resin forming component an isocyanate-terminated, moisture curable prepolymer which is the catalyzed reaction product of a mixture consisting essentially of methylene bis (4-cyclohexyl isocyanate), a polyoxypropylene diol, a polyoxypropylene polyol having a hydroxyl functionality of at least three and bis (2,2,6,6 tetramethyl piperidinyl-4) sebacate, the ratio of isocyanate groups to total hydroxyl groups and amine groups initially being at least 1.5 to 1, said bis piperidinyl sebacate being chemically reacted into the prepolymer molecules,
- a color producing pigment,
- aluminum flakes,
- a catalyst to enhance the moisture curing of said paint composition, and
- a solvent in an amount to reduce the viscosity of the composition for spray application, the nonvolatile content of the composition making up 60 to 70 weight percent of the total,
- the combination of said constituents in a curing film produced from said composition cooperating to permit the aluminum flakes to orient substantially parallel to the surface of the cured film, the cured film thereby displaying a high degree of geometric metamerism and further having improved stability when exposed to ultraviolet radiation.

6. A high-solids, moisture curable topcoat paint composition containing a metal flake pigment and formulated to be sprayed onto a substrate and to flow and cure thereon into a polyurethane film in which the metal flakes are oriented so as to interact with incident light to produce geometric metamerism, said composition comprising
- as the binder resin forming component an isocyanate-terminated, moisture curable prepolymer which is the catalyzed reaction product of a mixture consisting essentially of methylene bis (4-cyclohexyl isocyanate), a polyoxypropylene diol, a polyoxypropylene polyol having a hydroxyl functionality of at least three and bis (2,2,6,6 tetramethyl piperidinyl-4) sebacate, the ratio of the isocyanate groups to total hydroxyl groups initially being at least 2 to 1, said bis piperidinyl sebacate being chemically reacted into the prepolymer molecules,
- a color producing pigment,
- aluminum flakes,
- a catalyst to enhance the moisture curing of said paint composition, and
- a solvent in an amount to reduce the viscosity of the composition for spray application, the nonvolatile content of the composition making up 60 to 70 weight percent of the total,
- the combination of said constituents in a curing film produced from said composition cooperating to permit the aluminum flakes to orient substantially parallel to the surface of the cured film, the cured film thereby displaying a high degree of geometric metamerism and further having improved stability when exposed to ultraviolet radiation.

* * * * *